(12) United States Patent
Metzler et al.

(10) Patent No.: US 11,015,930 B2
(45) Date of Patent: May 25, 2021

(54) METHOD FOR 2D PICTURE BASED CONGLOMERATION IN 3D SURVEYING

(71) Applicant: LEICA GEOSYSTEMS AG, Heerbrugg (CH)

(72) Inventors: Bernhard Metzler, Dornbirn (AT); Tobias Heller, Rebstein (CH); Siegfried Wiltsche, Wolfurt (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 80 days.

(21) Appl. No.: 16/197,029

(22) Filed: Nov. 20, 2018

(65) Prior Publication Data

US 2019/0162534 A1     May 30, 2019

(30) Foreign Application Priority Data

Nov. 24, 2017    (EP) ..................................... 17203519

(51) Int. Cl.
     *G01C 11/00*      (2006.01)
     *G01C 11/30*      (2006.01)
     (Continued)

(52) U.S. Cl.
     CPC .............. *G01C 11/30* (2013.01); *G01C 11/02* (2013.01); *G06T 7/97* (2017.01); *H04N 5/23216* (2013.01); *G06T 2207/10012* (2013.01)

(58) Field of Classification Search
     CPC ........... G01C 11/30; G01C 11/02; G06T 7/97; G06T 2207/10012; H04N 5/23216
     See application file for complete search history.

(56) References Cited

U.S. PATENT DOCUMENTS

| 5,432,712 A | 7/1995 | Chan |
| 7,568,289 B2 | 8/2009 | Burlingham et al. |

(Continued)

FOREIGN PATENT DOCUMENTS

| EP | 2 051 102 A1 | 4/2009 |
| WO | 2013/033787 A1 | 3/2013 |

(Continued)

OTHER PUBLICATIONS

Extended European Search Report dated Jun. 6, 2018 as received in Application No. EP 17 20 3519.

*Primary Examiner* — Pakee Fang
(74) *Attorney, Agent, or Firm* — Maschoff Brennan

(57) ABSTRACT

A method for a three dimensional surveying of a 3D-scene for deriving a true-to-size 3D-model. It involves deriving a first 3D-partial-model of a section of the 3D-scene together with a capturing of at least one first 2D-visual-image and a second 3D-partial-model of another section of the 3D-scene, together with a capturing of at least one second 2D-visual-image, wherein the 3D-partial-models are partially overlapping. The first 3D-partial-model is conglomerated with the second 3D-partial-model to form the 3D-model of the 3D-scene, which is done with defining a first line segment in the first 2D-visual-image and a second line segment in the second 2D-visual-image, which first and second line segments are representing a visual feature, which is common in both of the 2D-visual-images. The line segments in the 2D-visual-images are utilized in conglomerating the corresponding 3D-partial models to form the 3D-model of the whole 3D-scene.

21 Claims, 6 Drawing Sheets

(51) Int. Cl.
    *G01C 11/02*     (2006.01)
    *G06T 7/00*     (2017.01)
    *H04N 5/232*     (2006.01)

(56) References Cited

U.S. PATENT DOCUMENTS

| | | |
|---|---|---|
| 8,587,583 B2 | 11/2013 | Newcombe et al. |
| 9,752,863 B2 | 9/2017 | Hinderling et al. |
| 2005/0089213 A1 | 4/2005 | Geng |
| 2011/0285696 A1* | 11/2011 | Ocali ............... G06T 19/20 |
| | | 345/419 |
| 2012/0188559 A1 | 7/2012 | Becker et al. |
| 2015/0104096 A1* | 4/2015 | Melax ............... G06T 7/20 |
| | | 382/154 |
| 2015/0249807 A1* | 9/2015 | Naylor ........... G08B 13/19613 |
| | | 348/155 |
| 2017/0109915 A1* | 4/2017 | Kreeger ............ G06T 7/187 |
| 2018/0061059 A1* | 3/2018 | Xu ................... G06T 7/0012 |

FOREIGN PATENT DOCUMENTS

| | | |
|---|---|---|
| WO | 2014/060562 A1 | 4/2014 |
| WO | 2016/065063 A1 | 4/2016 |

\* cited by examiner

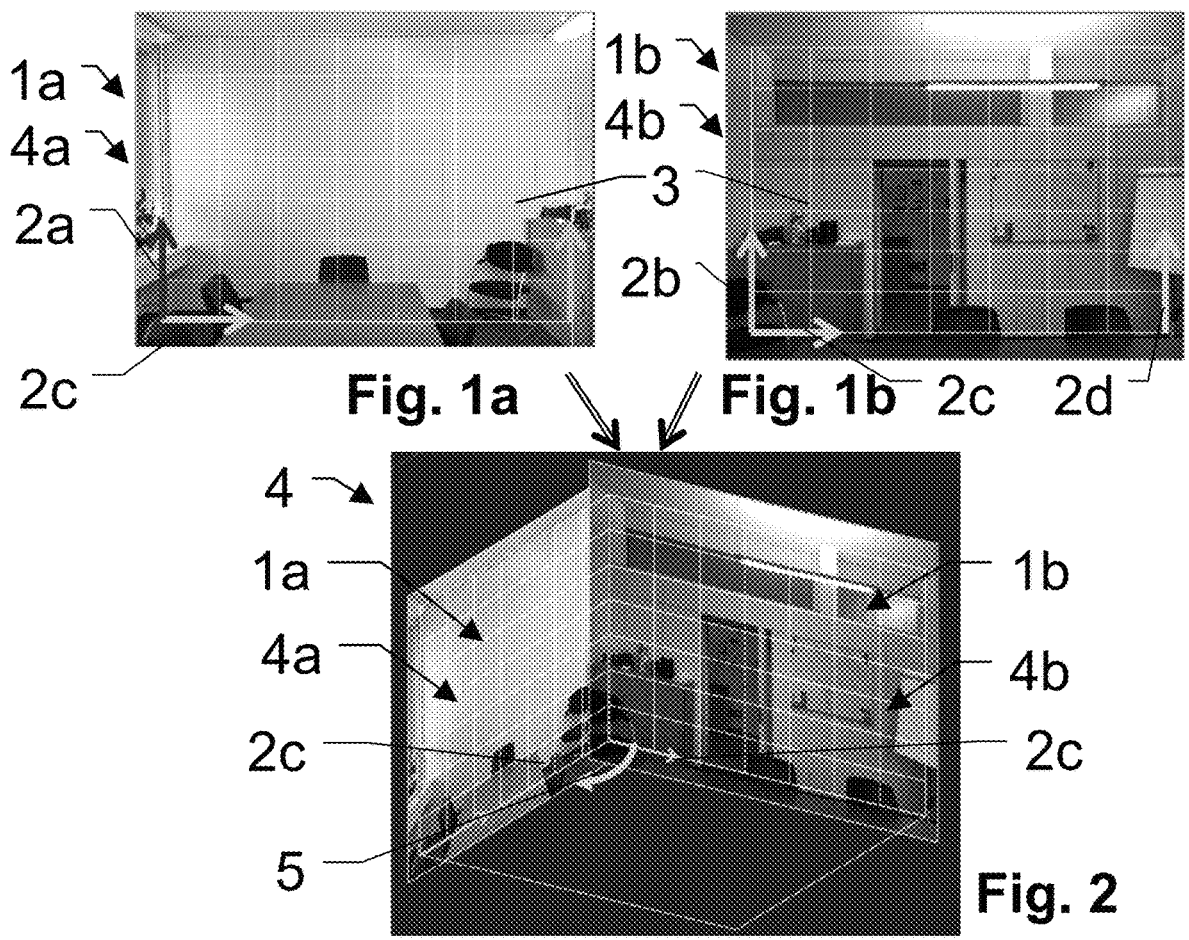
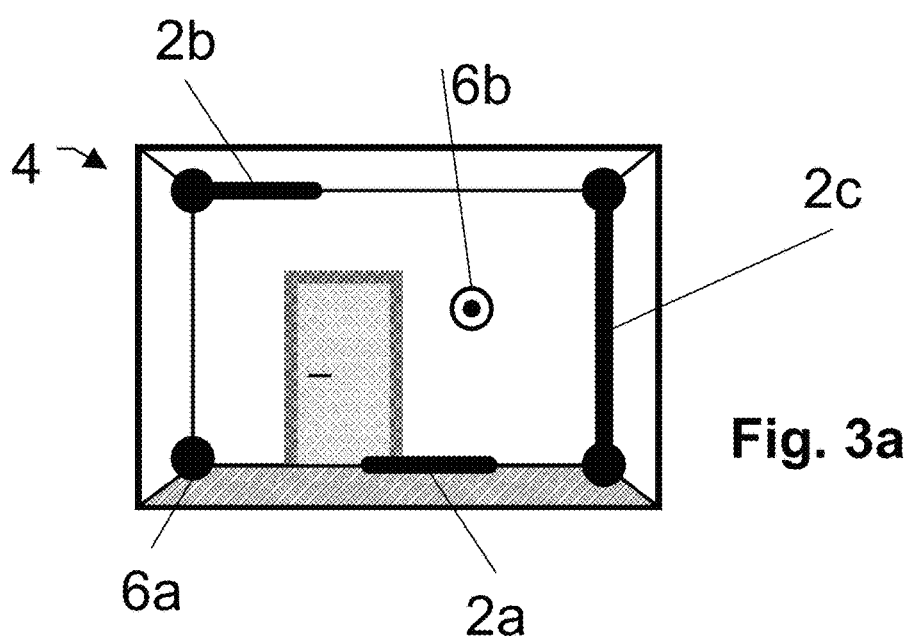

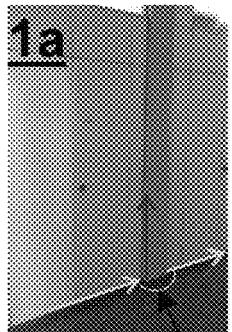
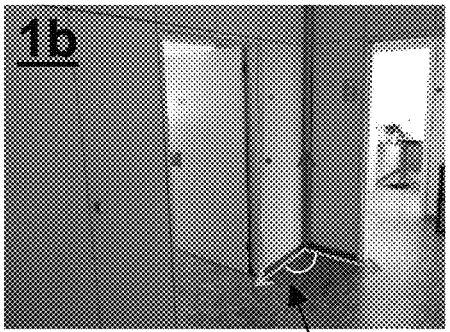
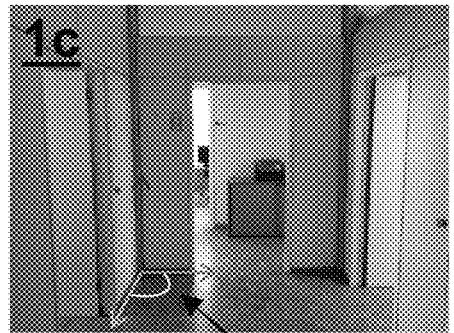
Fig. 4a  Fig. 4b  Fig. 4c
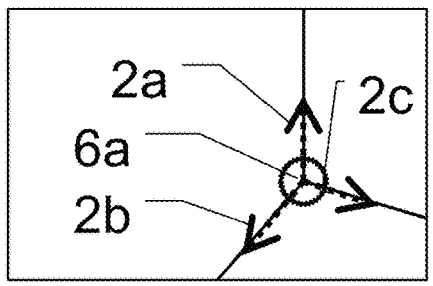
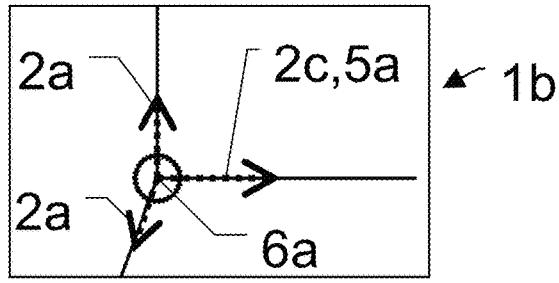
Fig. 5a  Fig. 5b
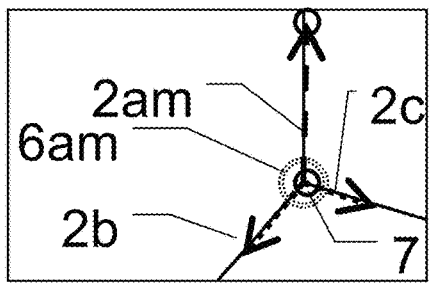
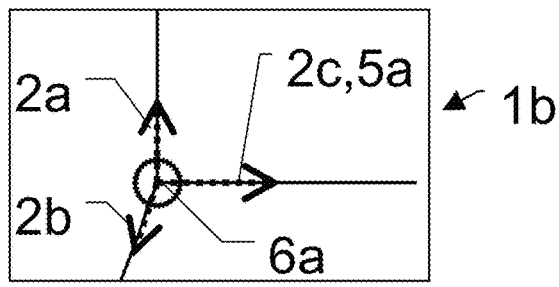
Fig. 6a  Fig. 6b
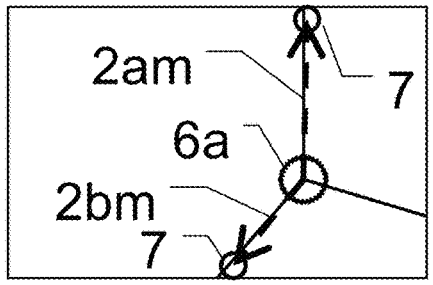
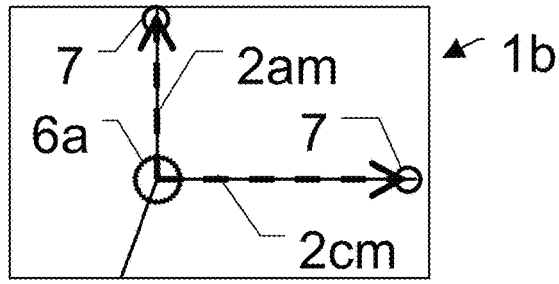
Fig. 7a  Fig. 7b

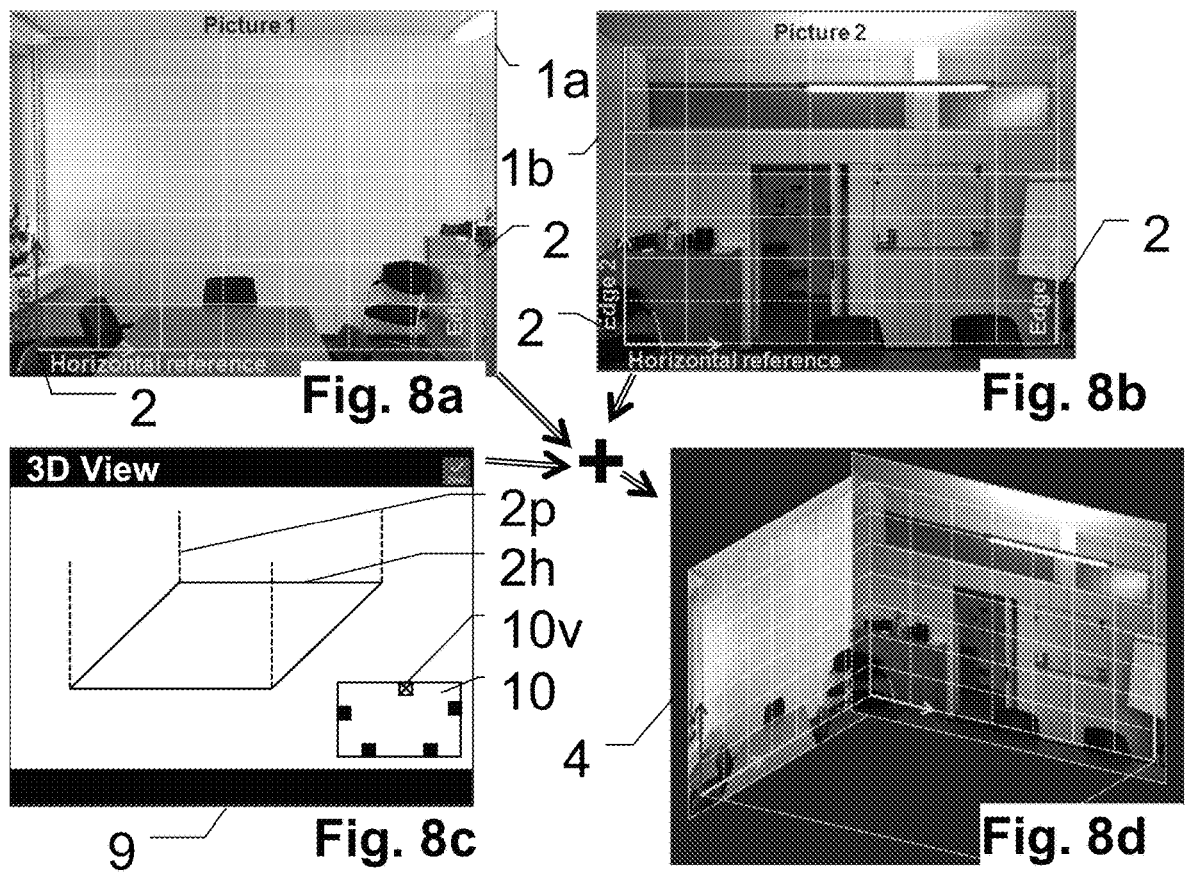
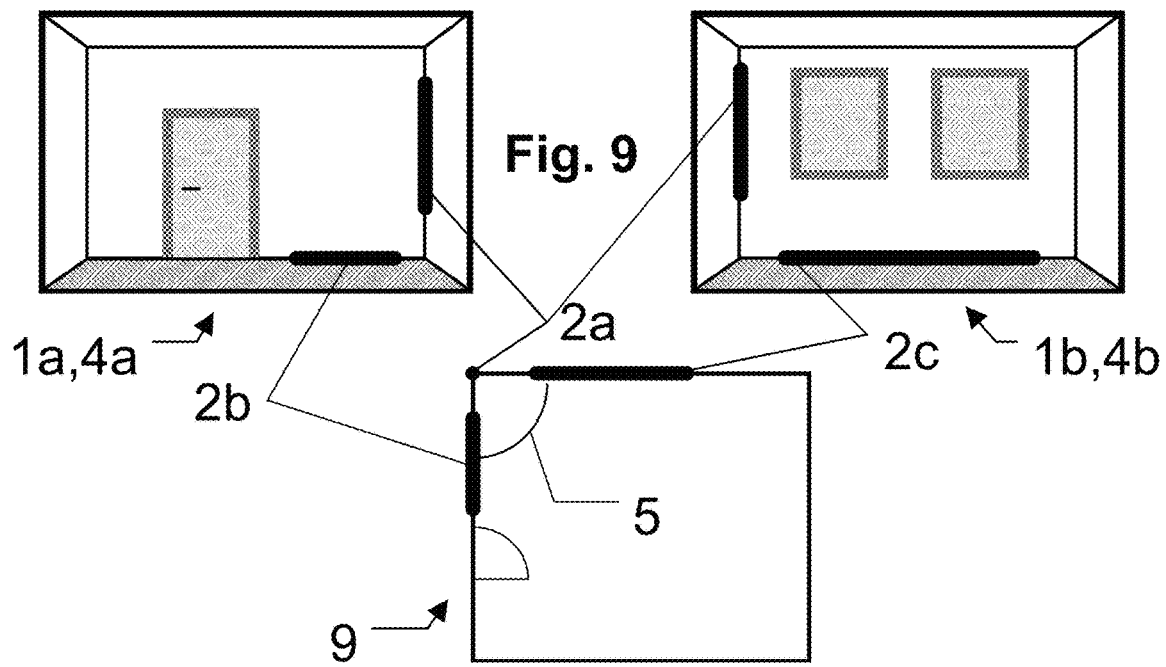

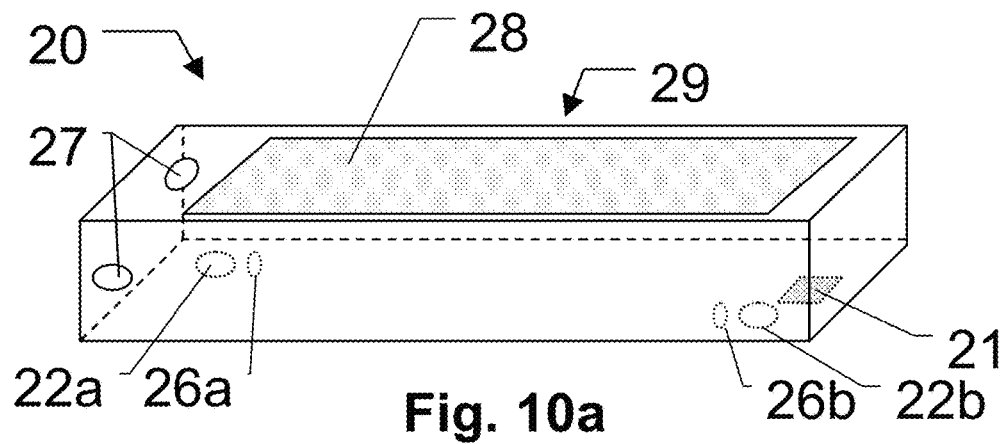
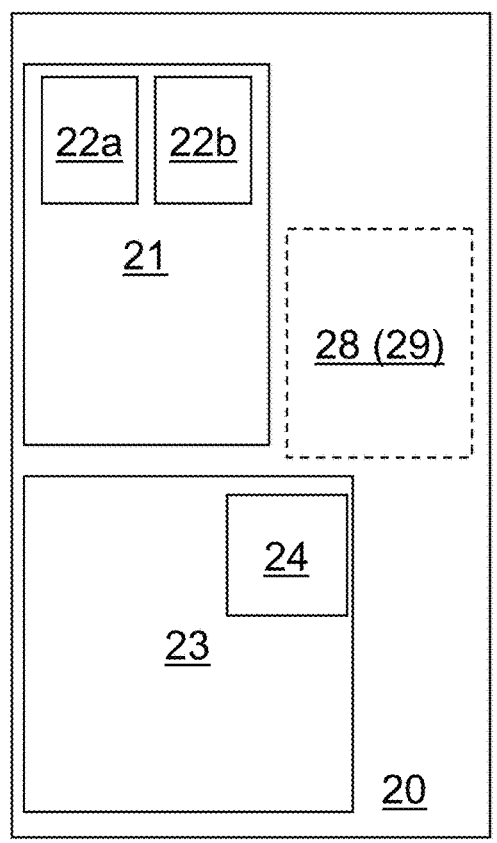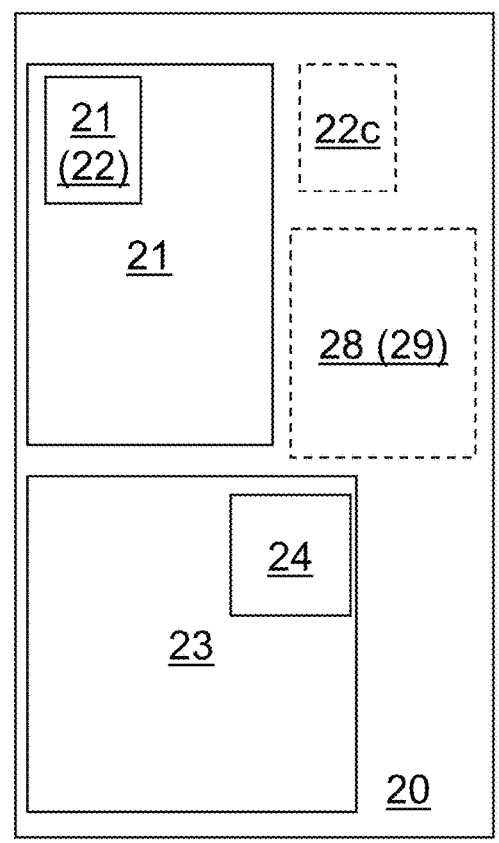

METHOD FOR 2D PICTURE BASED CONGLOMERATION IN 3D SURVEYING

CROSS-REFERENCE TO RELATED APPLICATIONS

This application claims priority to European Patent Application No. 17203519.8, filed on Nov. 24, 2017. The foregoing patent application are incorporated herein by reference.

FIELD OF INVENTION

The present invention relates generally to a method and device for generating a true-to-size or 3D-model of a real world scene and to corresponding auxiliary aids and computer-implementations according to the invention.

BACKGROUND

Measurements of a real world 3D-scene, such as e.g. a room, a hall, a building, an object, or parts thereof etc. are required for many purposes. In particular many constructional measures, construction work tasks, construction site coordination, Building-Information-Management (BIM)-systems, installation work, furnishing, carpentering, etc. rely on measurements of already constructed portions, which are herein generally referred to as a 3D-scene. While pocket rule, protractor, spirit level, plummet etc. are more and more replaced by electronic measurement devices like electronic distance meters, such as a DISTO, tilt sensors, laser liners, etc. there is still much labor in the actual reconstruction of a sufficiently accurate 3D-model of a 3D-scene which is suitable for construction work tasks. Examples of such devices can e.g. be found in EP 2 051 102 or U.S. Pat. No. 7,568,289. It is also not unusual that some measurements are forgotten, are only realized be of importance in a later stage or turn out to be ambiguous—wherefore the on-site measurements have to be repeated.

There are devices such as laser-scanners like e.g. in U.S. Pat. No. 9,752,863 or US 2012/188559, which are capable of measuring or surveying a whole 3D-scene, but such are not only pricy and far too complicated to handle for an average craftsman, but also the measurement and the evaluation of the measurement result is often far to complex and can only be done by a highly skilled craftsman or engineer.

Simpler approaches for 3D-capturing, like those used in computer gaming and entertainment environments, e.g. as a Kinect-device or as in U.S. Pat. No. 8,587,583, are not suitable for absolute measurements of high accuracy, in such a way as it is required for construction work which often requires an accuracy of about 1 cm or preferably even below. As 3D-captures of such entertainment-devices are not dimension accurate (which is also not at all required for their intended purpose anyway), those are not capable to derive a true-to-size or dimensionally stable 3D-model of a scene as desired in the present scope of construction work.

BRIEF DESCRIPTION

It is therefore an object to improve a deriving of a true-to-size 3D-model of a 3D-scene to be measured or surveyed, in particular in a way which is sufficiently accurate for construction work, robust and easy to be handled. Such is in particular achieved by providing a device and/or a method to accomplish such.

Part of the object can also be that measurement accuracy does not suffer from the fact that multiple different recordings are required to capture the whole 3D-scene.

It is also an object to provide a way to achieve such quickly and intuitively by providing a computer program product by which such a 3D-model can be generated, in particular when multiple recordings are required to cover the whole desired 3D-scene.

Those objects are achieved by realizing the features of the independent claims. Features which further develop the invention in an alternative or advantageous manner are described in the dependent patent claims.

By nature, humans are mostly vision based. So given the task to measure or survey a scene, e.g. a room, a hall, a building or an item by a device—he/she prefers having a camera-like device, showing a 2D-image of what he/she is actually capturing. Although technology has reached a point where it is—at least theoretically—technically possible to do a purely 3D-based scene-capturing, the human craftsman in general still prefers a simple flat 2D-picture view, over more complex 3D-views. Another aspect is also that 2D-screens are well established and known, whereas real 3D-screens are seldom used, e.g. as those are technically complicated, not so well advanced, limited in their capabilities, expensive, demanding auxiliaries like special goggles, visors, etc., Therefore, according to an aspect of some embodiments of the present invention, such a surveying or measurement system for 3D-scenes—although actually deriving a 3D-model of the scene—is based on 2D-pictures and 2D-views presented to the operator.

The craftsman is, mostly intuitively, taking a picture of each of the walls of a room (or a sequence of multiple successive pictures of a wall if this wall does not fit completely within the field of view (FOV) of a single picture). Intuitively, he will almost always try to capture a small portion of a corner of the wall at the edge of the image.

There are computation systems known, which are automatically stitching multiple pictures to form a panoramic view, but those rely on a rather large overlap of the pictures, in general about a half or a third of the picture. Yet, for the craftsman it is not intuitive to take pictures with such a large overlap, in particular as his mind is well capable of combining pictures with much lower overlaps. Yet, the known panoramic stitching approaches are not well capable or error-prone when working on such a basis. In other cases, corners or edges of a wall are not even visible in the picture, e.g. due to short object-camera distances in rooms and also the problem of undesired distortions which would be caused by extreme wide-angle objectives lenses.

Therefore, according to a further aspect of the present invention, such a surveying or measurement system for 3D-scenes has to comprehend and to cope with the users intuitive behavior and to provide him with a solution which is intuitive for the human mind, even for an untrained operator.

A simple approach would be to actually provide the user only with a limited portion of the real field of view which is actually captured by the hardware system, in such a way that there is actually a sufficient overlap of the captured pictures, even if the user-chosen overlap in the limited view which was provided to the user would be insufficient—but such is not the main core of the present invention.

According to some aspects of the present invention, those objects can be solved by providing a device and/or method for a three dimensional surveying of a 3D-scene for deriving a true-to-size 3D-model. This involves deriving a first 3D-partial-model of a section of the 3D-scene together with a capturing of at least one corresponding first 2D-visual-image. Since this does not cover the whole of the desired 3D-scene it also involves deriving a second 3D-partial-model of another section of the 3D-scene, together with a capturing of at least one therewith corresponding second 2D-visual-image. Those capturings can be established from different points of view and/or with different directions of view, wherein the 3D-partial-models are partially overlapping, e.g. in less than 50%, less than 30%, or about 5% or 10% only. According to the invention, the first 3D-partial-model is then conglomerated with the second 3D-partial-model to form the 3D-model of the 3D-scene, which is done with a defining of a first line segment in the first 2D-visual-image and of a second line segment in the second 2D-visual-image, which first and second line segments are representing a visual feature in the 2D-visual-images, preferably a visual feature which is common in both of the 2D-visual images or which line segments are having a defined geometric relation or constraint in-between the 2D visual images. The first and second line segments in the 2D-visual-images are utilized in conglomerating or combining of the corresponding 3D-partial models to form the 3D-model of the whole 3D-scene. For example by applying geometric restrictions in the conglomeration, like e.g. fixating one or more degrees of freedom in the conglomeration.

In prose, the conglomeration according to the invention is done with the aid of line segments which are defined by means of the 2D-visual images, not directly in the 3D-partial-models themselves.

In other words, some embodiments of the invention relate to a method for a three dimensional measuring or surveying of a 3D-scene for deriving a true-to-size 3D-model of the 3D-scene. The 3D-model is therefore dimensionally stable, so it is a 3D-model of which dimensional measurements can be taken, for example scaled dimensional and/or angular measurements of the 3D-model with an accuracy of at least a few centimeters, preferably a few millimeters or even below. The 3D-scene can in particular be embodied as an indoor scene, like a room, a hall, etc. as a field of view restriction discussed above is then dominating, but the invention can optionally also be applied to an outdoor scene.

The method comprises deriving a first 3D-partial-model of an, in particular incomplete, section of the 3D-scene, which deriving comprises a capturing of at least one first 2D-visual-image, which first 2D-visual-image is corresponding to the first 3D-partial-model. The method also comprises a deriving of a second 3D-partial-model of an, in particular another incomplete, section of the 3D-scene, which deriving comprises a capturing of at least one second 2D-visual-image, which second 2D-visual-image is corresponding, complying or correlating to the second 3D-partial-model. Therein, the second 3D-partial-model is different from the first 3D-partial-model, e.g. it can be from a different point of view and/or with a different direction of view.

The first and the second 3D-partial-models, respectively the corresponding 2D-visual images, are therein at least partially overlapping, in many instances only overlapping in a small portion, like below 30%, below 20% or below 10% of their fields of view.

The method then comprises a conglomerating or combining of the first 3D-partial-model with the second 3D-partial-model to form the 3D-model of the whole 3D-scene which is desired to be measured. According to the invention this is done with a defining of a first line segment in the first 2D-visual-image and a defining of a second line segment in the second 2D-visual-image. The first and second line segments are representing a visual feature or sections of visual features in the 2D-visual images. Preferably the visual feature is a visual feature which is common in both of the first and second 2D-visual-image, in particular wherein the first and the second line segment at least partially coincide or overlap at the same visual feature, e.g. in the overlapping portion of the first and second 2D-visual image and/or in extension of the same visual feature. The visual feature can also define a defined geometric constraint other than being the same visual feature, like e.g. being orthogonal, parallel, in a defined angle, in the same plane, etc.

The thereby defined one or more first and second line segment within each of the first and second 2D-visual-images are the exploited or utilized in the conglomerating or combining of the corresponding first 3D-partial model with the second 3D-partial model to form the 3D-model of the 3D-scene, for example by thereby providing a geometric restrictions for the conglomerating of the 3D-partial models, defined by means of the line sections in the first and second 2D-visual images.

For example, according to some embodiments of the invention, in the first camera picture, a first line segment is defined and in the second camera picture a second line segment is defined, wherein the first and the second line segment are sections of a visible line feature, such as e.g. an edge- or corner-feature, which is common in both of the pictures. In particular the first and the second line segment can at least partially coincide or overlap. In another embodiment first and the second line segment can also just relate to the same visual feature or to features which at least have a known geometrical relation to one another.

The method can e.g. also additionally comprise that:

in addition to the first and the second line segments, one common point, in particular an endpoint or anchor point, of the first and the second line segments is defined within (both of) the first and the second 2D-visual-image; or in addition to the first and the second line segments, two common endpoints of the first and the second line segments are defined within (both of) the first and the second 2D-visual-image; or in addition to the first and the second line segments, at least one section of a common plane is defined within (both of) the first and the second 2D-visual-image, in particular wherein at least two line segments are spanning the common plane, preferably a level plane; or in addition to the first and the second line segments, at least one common singular point is defined within (both of) the first and the second 2D-visual-image; or a combination of at least two of above.

In the method, a group of two or more interconnected first or second line segments can be defined. For example for forming a template of a geometric feature or a construction work feature which is comprised in the 2D-visual image, in particular a template of known geometrical feature, preferably with defined geometric properties like parallels, right, angles, being in level, etc. like, e.g. a door, a window, a table, a corner, a baseboard, etc.

In the method, the defining of the first or second line segment can be done with a graphically overlaying of a graphical line symbol on the 2D-visual-image. Such can in particular comprise a providing of controls and/or handles for aligning the line symbol on the 2D-visual-image by user interaction. For example, the first and/or second line segment can comprise at least two handles, which are movable within the 2D-visual-image, for bringing said line segment into congruence with e.g. an edge- or line-feature within the 2D-visual image. In a special embodiment there can also be a providing of an automatic zooming of a portion of the 2D-visual image to which said line segment is brought into congruence. The marking of a line segment can not only be done by providing handles, but can alternatively or additionally also be done by drawing or dragging a line with a pen or a finger on a touch sensitive display, by mouse, by a contact-free input means, etc. In an embodiment of the invention there can be different types of feature markings which can be provided in the 2D-visual image by the user or with user-interactions. Those types of features can correspond to geometric features given in the image, wherein the different types can correspond to one or more degrees of freedom, which are defined and by this type of feature and which can be used as references in conglomerating the 3D-partial models. The types of features can be illustrated in the visual image (or optionally also in a 3D view) by specific symbols which represent those features. For example:
- a line can be used to fix up to two translational and two rotational degrees of freedom,
- a line segment with one defined endpoint can be used to fix up to three translational and two rotational degrees of freedom,
- a line segment with two defined endpoints can be used to fix up to three translational and two rotational degrees of freedom and a scale,
- a point can be used to fix up to three translational degrees of freedom,
- a plane (or a normal vector defined by the plane) can be used to fix up to one translational degree of freedom and up to two rotational degrees of freedom, wherein also another geometric primitives or combination of primitives, can be used. By a combination of multiple of such features, in general all 6 degrees of freedom can be fixed.

Those types of features can therein e.g. be selected from a menu, or they can be dragged from a side-bar to the corresponding location within the image. Also gesture recognition of a touch (or non-contact) input system can be used to distinct different types of features. For example, tapping can define a point, dragging can define a line, a (at least approximate) circling can refer to a plane (or for defining a normal vector for the plane), etc. In another embodiment, the system can also provide an automatic or semi-automatic detection of potential geometric features in the captures 2D and/or 3D data. Besides a fully automated attempt, a preferred option can provide an interactive suggestion of features derived by numerical processing to the 2D-images and/or 3D data for detecting the features, such as a machine learned detector, an image processing algorithm, an edge detection, etc.

Another embodiment according to the invention can comprise a marking (e.g. by tapping on a touch screen) a section of the 2D-image, for which section and its vicinity the system is then executing an automatically analyzing for detecting potential geometric features like edges, corners, a plane, etc. followed by a providing of a proposal of a geometric feature at the tapped location, e.g. by an according indication on a screen showing the 2D-image.

The method can also comprise an automatic snapping of the first or second line segment to a visual image feature such as an edge- or corner feature in the 2D-visual-image. In particular, the edge- or corner feature can be derived by an automatic pattern recognition unit. For example, an automatic fine snapping can be derived with a sub-pixel resolution of the 2D-picture, e.g. when the defining comprises an automatic identifying of a potential candidate for the at least one visual feature for aligning one of the line segments by an artificial intelligence computing unit or the like. There can be an automated fine-snapping of the at least one line section to such an automatically identified 2D-visual-image feature, e.g. for fine aligning of the least one line section within one of the 2D-visual images, without requiring an operator to establish a highly accurate alignment by hand. For example, line segments can be derived in sub-pixel accuracy from the 2D-images by edge-extraction and/or line-fitting algorithms. In addition or alternatively, the snapping can also be applied in the 3D-partial model, for example comprising a selecting or marking of a feature in the 2D-image, but with a snapping to a geometric feature in the 3D-partial model. Such a geometric feature in the 3D-partial model can be e.g. a line segment derived by a plane fitting and intersecting of two planes, a point by plane fitting and intersection of two planes, etc. As there is a known reference of the 2D visual image and the 3D-partial model,—although the fitting is at least partially done in the 3D model—a visual marking and handling of the features at the user side can still be done in a 2D-visual-image representation.

In the method, the first and the second line segments can also be assigned to a therewith corresponding feature in a virtual plan view, such as a floor plan, map or the like. This can comprise an additional defining of the line segments, as those are defined in the 2D-images, in a pre-given 2D or 3D digital floor plan of the 3D-scene. In particular, the digital floor plan can therein be only approximate or not to scale, for example only defining the shape, but not the dimensions of the room. As a floor plan is also kind of a virtually generated 2D-image, the same principles as for the 2D-visual-images can be applied. For example such a floor plan can comprise geometric restrictions of the defined line segment, like angular dependencies in-between the line segments.

The first or second line segment can be provided with a defined angular constraint (or other geometric relation) with respect to an additional line segment, point or plane. In particular, such a constraint can define a perpendicularity or a parallelism.

In an embodiment comprising a virtual plan view, such an angular constraint can, preferably automatically, be derived from the virtual plan view.

For the method, a point of view and/or direction of view for the deriving the first 3D-partial-model can differ from the one for the deriving the second 3D-partial-model, which means the capturing device can be moved around in the 3D-scene at random and it is not demanded to have a substantially single point of view as usual for taking panorama-pictures.

According to an aspect of some embodiments of the invention, by the defining the first line section within the first 2D-visual-image, the second line section can optionally also be automatically defined within the second 2D-visual-image, by automatically identifying analogous features within both of the 2D-visual-images by a numeric image processing unit.

In an embodiment of the invention, a capturing of the 3D-partial-models can be established by a stereo-camera, a triangulation or structured light arrangement, wherein the corresponding 2D-visual-image is captured by a camera of said stereo-camera, triangulation or structured light arrangement. The deriving of the first 3D-partial-model can be done by stereo-2D-imaging from at least two different points of view, resulting in a stereo-pair of 2D-visual-images as base, whereof the 3D-partial-model is derived, and wherein at least one of those stereo-pair 2D-visual-images is used in defining the at least one line segment.

The invention can be embodied as a surveying device for carrying out the method described herein, which at least comprises a 3D-sensor for deriving the 3D-partial-models and a 2D-visual-image-sensor for deriving the 2D-visual-images. In particular those two can be in a defined, and preferably known, arrangement with respect to one another. The device also comprises a 2D visual display for providing the 2D-visual-images with a touch screen for defining the line segments, and a numerical processing unit with a conglomerator for calculating the conglomerating of the 3D-partial-models based on the defined line segments, e.g. embodied in a computer chip.

The device can for example comprise at least two 2D-imaging cameras arranged in a stereo-basis with respect to each other. Those can be used for a stereoscopic 3D-partial-models deriving as well as for the 2D-visual-image capturing according to the invention. In another embodiment the device can comprises at least one 2D-imaging camera and at least one 3D-point-cloud or range image measuring unit, in particular a RIM-camera-sensor, a structured light 3D-sensor or a triangulation sensor.

The method, or at least those parts of it which involve computation and/or calculation, can also be embodied as one or more computer program products which are stored on a machine readable medium or embodied as electromagnetic wave (such as e.g. a wired or wireless data signal). Consequently, the invention further relates to such a computer program product comprising program code for a 3D-true to size 3D-modeling according to the invention. The computer program product is configured for executing a method as described above, in particular with a providing of an interface for a defining of line segments in 2D-visual-images and computing the thereby resulting geometric restrictions in a combination of multiple corresponding 3D-partial-models to form a conglomerated 3D-model.

For example, such a program code which is configured for deriving a true-to-size 3D-model of a 3D-scene, can comprises an acquiring of a first digital 3D-partial-model of a section of the 3D-scene, e.g. by reading 3D-data from a 3D-sensor-unit, which comprises at least one first digital 2D-visual-image, e.g. by reading picture data from a digital camera unit. In the same manner, an acquiring of a second digital 3D-partial-model of a section of the 3D-scene, which comprises at least one second digital 2D-visual-image is comprised. In particular the according 3D-partial model can be derived by a programmed stereo-imaging analysis on at least two images each of which is taken by a corresponding digital camera that is arranged in a stereo-basis with respect to the other. Therein, at least one of the at least two images can be the 2D-visual-image taken together with the corresponding 3D-partial-model. The computer program is then configured to execute a numerically conglomerating the first 3D-partial-model with the second 3D-partial-model to form the 3D-model of the 3D-scene. Such is programmed to be done with utilizing a first line segment defined in the first 2D-visual-image and also a second line segment defined in the second 2D-visual-image. Those line segments are representing a same visual feature in each of the first and second 2D-visual-image and can be provided to the computer program, e.g. by an operators input. The line segments can in particular be utilized as a geometrical restriction in the numerically conglomerating of the 3D-partial models.

The computer program can be executed in a device, which device therefore also involves a computation means built to run a computer program providing the functionality according to the invention, with or without the computer program actually loaded.

BRIEF DESCRIPTION OF THE DRAWINGS

Units, methods and systems according to the invention are described or explained in more detail below, purely by way of example, with reference to working examples shown schematically in the drawing. Specifically, FIG. 1a and FIG. 1b are showing examples of embodiments of annotated 2D-visual-images according to the invention;

FIG. 2 illustrates an example of a first embodiment of a derived true-to-size 3D-model according to the invention;

FIG. 3a, FIG. 3b, FIG. 3c, FIG. 3d are showing examples of pairs of line sections in the 2D-visual pictures according to the invention;

FIG. 4a, FIG. 4b, FIG. 4c are showing examples illustrating 2D-visual-images with an overlay of line sections according to the invention;

FIG. 5a and FIG. 5b, FIG. 6a and FIG. 6b as well as FIG. 7a and FIG. 7b are showing embodiments of alignments of line sections in 2D-visual-images according to the invention;

FIG. 8a, FIG. 8b, FIG. 8c and FIG. 8d are showing examples of embodiments of the invention involving constraints defined in a virtual floor plan;

FIG. 9 shows an example illustrating another embodiment of the invention comprising an initially incomplete or not-to-scale plan-view;

FIG. 10a is illustrating an example an embodiment of a device according to the invention;

FIG. 10b shows a first example illustrating a simplified block diagram of a device according to the invention;

FIG. 10c shows a second example illustrating a simplified block diagram of a device according to the invention;

DETAILED DESCRIPTION

Figure 3B:
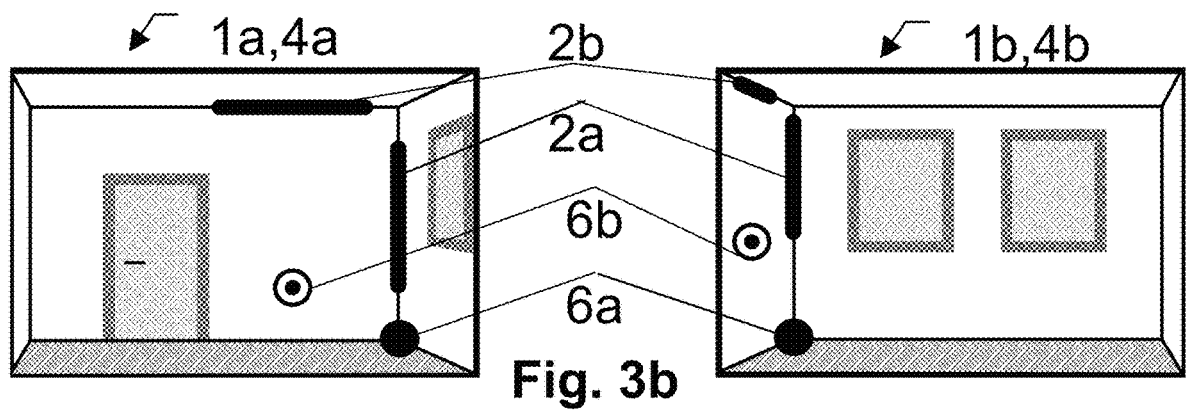

The diagrams of the figures should not be considered as being drawn to scale. Where appropriate, the same reference signs are used for the same features or for features with similar functionalities. Different indices to reference signs are used to differentiate between different embodiments of the same or an equivalent feature that is shown exemplary. The term "substantially" is herein used to describe the fact that a certain value, arrangement or feature does not necessarily need to be 100% exact, but can maybe slightly aberrate, while still being within scope. In other words, there can be some slight deviations, e.g. due to inaccuracies, unintentional, design considerations, tolerances, etc.—but there is a clear tendency towards the mentioned value or arrangement, in particular in view of the technical effect to be achieved therewith. Especially, it is not meant to be an obvious opposite. In any case, besides the meaning of "almost exactly" the term "substantially" can always be interpreted to comprise or also express the meaning of "exactly", or of the particular feature itself.

An example of an embodiment of the present invention is illustrated in FIG. 1a, FIG. 1b and FIG. 2.

The example in FIG. 1a illustrates an exemplary first 2D-visual-image 1a, overlaid by some first line-segments 2a,2b,2c. Also shown is a non-mandatory viewing-grid 3.

Such a first 2D-visual-image 1a is taken by a measuring or surveying device, in particular by a device according to the present invention. For example, but not limited to, the 2D-visual image can be embodied as one image of stereoscopic view which is used to derive the 3D-partial model. The 2D-visual-image 1a can be taken by a kind of camera-system, comprising a, preferably digital, image sensor and an optical system with lenses and/or other optical components. The camera-system can therein preferably be calibrated as known in the art to compensate for geometric- and/or optical-distortions, color- and/or intensity-deviations, etc., e.g. by an evaluation of a defined reference pattern. In the shown example, the 3D-scene to be surveyed by the device is the inside of a briefing room, which is planned to be modernized by some construction work. The craftsman is therefore taking a device for measuring the room—which represents the 3D-scene to be surveyed—in order to derive a 3D-model 4 of the room which is true to size (or in other words dimensionally stable). Upon this 3d-model 4, measurements for construction work will then be planned and/or executed. In terms to do so, the 3D-model 4 is required to be dimensionally accurate in the order of at least about a cm or preferably in the mm magnitude. In the figure, the 3D-model 4 is not explicitly shown due to lack of a reasonably comprehensible presentability.

Therefore, the device captures a 3D-model 4a by an according 3D-sensor-unit. The 3D-sensor unit is preferably working optically in the visible and/or invisible spectral range and can e.g. be implemented based on stereoscopic principles, triangulation or deflectometry, like stereoscopic pictures, light-section, structured light, pattern and stripe projection measurements, SLAM-calculations, etc., or based on time-of-flight or phase-based distance measurement, like a RIM-camera, an electronic distance meter, or the like, alone or in combination. Also scanning-type 3D-sensors are known.

According to the invention—for reasons discussed below—together with the pure geometrical 3D-model 4a information recording, there is also at least one 2D-visual-image 1a or photo taken by the same device, which 2D-visual-image 1a corresponds to the 3D-model 4a. In many of the instances of embodiments of 3D-sensors described above, such can be inherently given, e.g. in stereoscopic pictures or others of those which inherently comprise a camera capable of capturing 2D-visual-images 1a. If latter should not be the case, the device can comprise a dedicated visual camera in addition to the 3D-sensor. Prior devices thereby might partially comprise some of the rudimentary structural components at random, but do not anticipate the present invention.

Due to the limited field of view (FOV) of the device—and also because of the limited size of the room, it is not possible to measure the whole 3D-scene—which is actually required to be reflected in the 3D-model 4—in a single 3D-measurement. According to the invention, this is solved by taking multiple 3D-partial-model 4a,4b, . . . measurements of sections of the 3D-scene which are fitting into the field of view. For example, the first field of view as shown in FIG. 1a and the second field of view as shown in FIG. 1b by the second 2D-visual-image 1b. Again there is also a not explicitly shown corresponding second 3D-partial-image 4b taken. Those fields of view can be taken from the same point of view, but can according to the invention also be taken from different points of view—which will be a likely case for small rooms. The viewing direction of the first and the second view are different. In the shown example, the first field of view comprises a first wall of the room and the second field of view comprises a second wall of the room. A craftsman will in general intuitively consider to capture such, or similar views, when given the task to measure or survey the room.

Therein, the problem arises that there are two, or in case of a lager 3D-scene to be 3D-modeled probably more than two, 3D-partial-models 4a,4b of the 3D-scene taken. The present invention now combines those first and second 3D-partial-models 4a,4b with a specific approach to result in the 3D-model 4 of the whole 3D-scene which has to be measured. There are automatic algorithms known to establish such, but those rely on a large redundancy by large overlaps in-between of the 3D-partial models 4a,4b, which in the present invention is not required and, as discussed, often also not given of its own accord.

One aspect of the present invention is that an ordinary user—such as an on-site craftsman and not a highly skilled 3D-design-engineer trained on 3D-CAD systems—in general has difficulties to handle 3D-models on their own.

The present invention therefore proposes not to provide the operator with the multiple 3D-partial-models 4a,4b at first hand, but instead to take and provide simpler 2D-visual-images 1a,1b to the operator, which 2D-visual-images were taken for this purpose upon capturing the corresponding 3D-partial-models 4a,4b.

According to the invention, the operator handles the 2D-visual-images 1a,1b. He is thereby enabled to aid or enable the conglomerating or combining of the 3D-partial-models 4a,4b to a complete 3D-scene-model without being required to actually interact with the 3D-partial-models 4a,4b themselves or directly.

According to the invention such is done by at least one line segment 2 within the 2D-visual-image 1a, e.g. indicated by specifically embodiments 2a,2b,2c, . . . of such line segments 2) being graphically overlaid to the 2D-visual-image 1a shown to the operator. Such a line segment 2 is provided as a first line segment 2b in the first 2D-visual-image 1a and as a second line segment 2b in the second 2D-visual-image 1b. In the shown embodiment there is also another pair of corresponding or common line segments 2c in the first and second 2D-visual-images 1a and 1b.

By aid of this information about the first and the second line segment 2b, the image-corresponding first 3D-partial-model 4a and second 3D-partial-model 4b are conglomerated to form the 3D-model 4 of the full 3D-scene.

Such a conglomerating is tried to be shown in FIG. 2.—illustrating the walls from FIG. 1a and FIG. 1b combined to a 3D-model-view of the corner-scene of the room, using information on the line segments 2a,2b,2c in the 2D-visual images 1a and 1b. In the combining or conglomerating of the first 3D-partial-model 4a with the second 3D-partial-model 4b, the line segments 2b and 2c, each present in at least a first and a second 2D-Visual image 1a,1b are used to result in the 3D-model 4 according to the invention. The approach according to the invention establishes an accurate reference of the 3D-partial-models, providing a true to size 3D-model in their combination, which in particular can fulfill the accuracy requirements for construction work.

Another not mandatory option which is shown in this embodiment is a definition of a geometric restriction in-between a first and second line section 2c, here given by the example of an angular restriction 5 of a 90° angular arrangement. Other examples of restrictions 5 will be discussed in the following.

The example in FIG. 3a illustrates some exemplary embodiment of such line segments 2a,2b,2c according to the invention in an abstracted view of a 3D-scene, depicted in the 2D-visual image 1. There is e.g. a line segment 2*a* in the 2D-visual-image of the 3D-scene, which is located at the edge between the floor and the wall. The lines segment 2*a* indicates this edge and is located somewhere along this edge where convenient, but in this embodiment it is not having a defined start- and/or endpoint—also known as a straight in geometry. It can for example be considered to indicate the direction of this edge in the 2D-image respectively in the corresponding 3D-partial model.

The line segment 2*b* at the top-left corner of the room has a defined start-point (or end-point depending on the definition), which is here shown to be right in the corner of the room. The line segment 2*b* also indicates the direction of the edge between wall and ceiling. In other words, this line segment 2*b* can also be described as a vector, defined by its starting point and its direction, although its length and endpoint needs not to be defined—also known as ray in geometry. Such a start point can be in the corner of the room, but can optionally also be any defined point along this edge, e.g. at any identifiable item or marking along the edge.

The line segment 2*c* to the right is a line segment which is characterized by a defined starting point and a defined endpoint—also known as line in geometry. For example defined by specific points at the top and bottom room corner, and thereby defining the vertical room corner. In the 2D-visual image 1,1*a*,1*b* there are in general always line segments 2*a*,2*b*, . . . defined and/or drawn, as it is (per definition) not actually possible to drawn an infinite line or the like. Nevertheless, the line-segment 2*a*,2*b*, . . . according to the invention can also represent a geometric feature which in fact defines such an (infinite) line without actually defined endpoints, or a vector or the like. For example by showing endpoints or corner points in the picture (optionally even with handles for manipulating them), but not using them as endpoints for the geometric feature they are representing. For example there can be only a portion of a corner or edge being indicted by a line-segment in the picture, but this line segment can actually define a line or a direction without specific endpoints for the conglomerating.

Besides the line segments discussed above, the present invention can additionally also comprise information about a single point 6*a*, which can be exactly defined by a visual feature in the first and in the second 2D-visual-image 1*a*,1*b*. Here exemplary shown is a corner of the room, but it can also be another visually prominent fixed point 6*a*.

As another additional option besides the line segments 2 discussed above, the present invention can additionally also comprise information about a plane or flat surface in the 2D-visual-image 1*a*,1*b*, as indicated by the symbol 6*b*. Whereas some geometric features like a point or the like are in general at the same real world location in all of the images in which they are defined, features like a line, a plane or the like need not to be exactly at the same location but can be provided at a different locations at/along the feature which is represented by them. A flat floor can for example be defined substantially anywhere on the floor, in particular also in different pictures 1 at a different locations on that same floor. Or an edge or corner can be marked at different locations along this corner or edge to define a same line or direction for the conglomerating of the corresponding 3D-partial models.

As described above, according to the invention, one or more of such line segments 2, optionally supplemented by points 6*a* or planes 6*b*, are provided in the first 2D-visual image 1*a* of the first field of view as well as in the second 2D-visual image 1*b* of the second field of view. According to the invention the geometrical information gained thereby is utilized to conglomerate the respective corresponding first 3D-partial-model 4*a* and second 3D-partial model 4*b* to form a 3D-model 4 of the scene.

The invention can thereby for example overcome a problem of having an overlap of the 3D-partial-models, which is too low to achieve an accurate 3D-conglomeration of the 3D-partial-models to form the whole scene with sufficient accuracy and certainty, which in cases of a low overlap can not be achieved automatically and on its own by a pure 3D-point-cloud-matching or the like. A lower overlap can e.g. be advantageous as less captures are required, which saves time and memory.

In a special embodiment an IMU or tilt sensor in the device can be used to automatically indicate substantially horizontal and/or vertical directions within the 2D-visual images 1*a,b* and/or 3D-partial models 4*a*,4*b*.

Figure 3C:
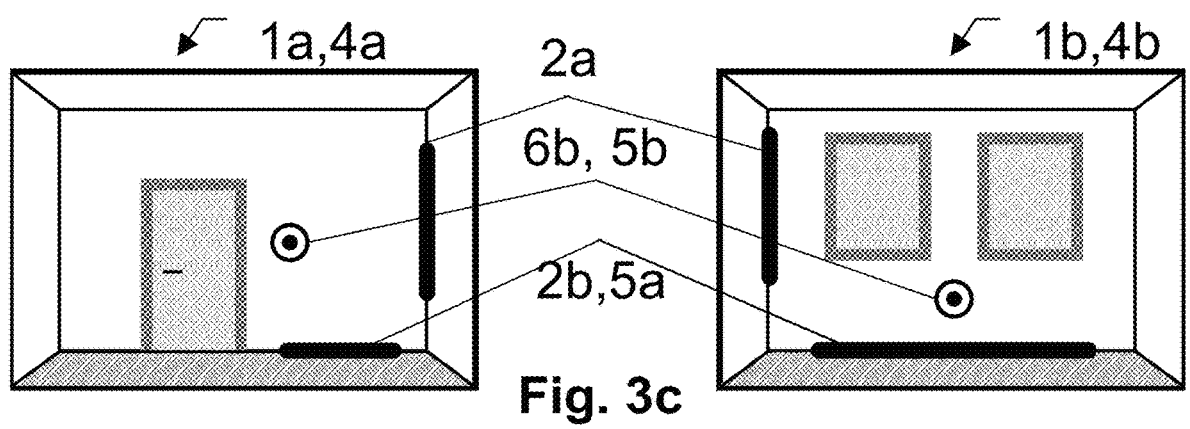
Figure 3D:
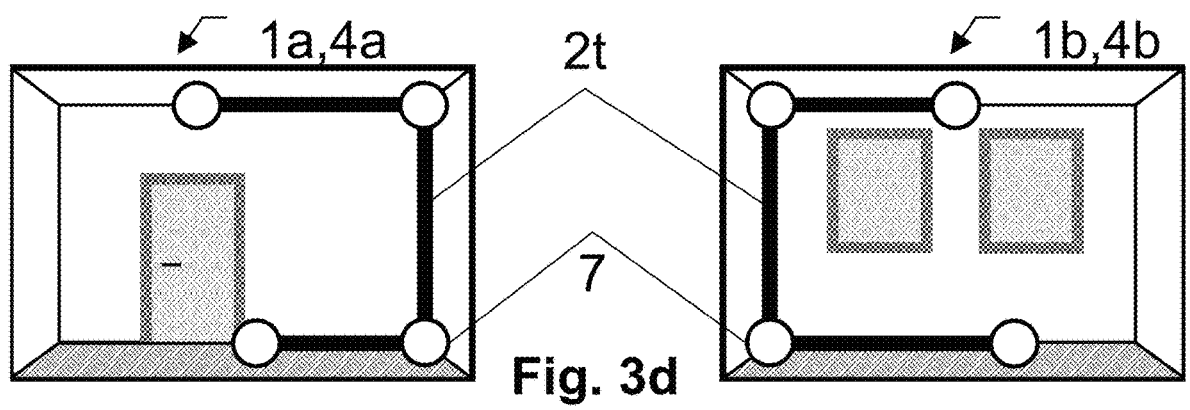

Some examples of embodiments are shown in FIG. 3*b*, FIG. 3*c* and FIG. 3*d*.

The exemplary embodiment of a 3D-modeling based on two different 3D-partial models 4*a*,4*b* which are overlapping in their field of view in only a very small portion is shown in FIG. 3*b*. The view in the left illustrates a first 2D-visual-image 1*a* taken together with the first 3D-partial-model 4*a* in first view of a first part of the 3D-scene. The view in the right illustrates a second 2D-visual-image 1*b* taken together with the first 3D-partial-model 4*b* in a second view of a second part of the 3D-scene which is desired to be measured.

There is a first pair of line sections 2*a*, comprising a first line section 2*a* defined in the first 2D-visual-image 1*a* and a corresponding second line section 2*a* in the second 2D visual picture 1*b* shown, which are corresponding in such a way that both of those are representing the same corner of the 3D-scene. Those line segments 2*a* can, but are not required to have a defined start or endpoint. Such defined start and/or endpoints are in particular provided in pairs (or triplets, etc. if provided in more than two images) which are referring to a same real world point in the according 2D-visual images, e.g. the same corner point of a room. A pairing of the points, lines, etc. in different images can in many cases be obvious, as there are only two or a few points (etc.) defined in the images and only one combination makes technical and geometrical sense, wherefore the pairing can be auto-detected by the system according to plausibility calculations. Another option would be a pairing provided by the user, either by explicitly pairing the points (etc.) or according to a logical sequence in which the points (etc.) are defined one after the other. Such a pairing can e.g. be marked by different colors, labeling, indexing, etc. of the corresponding symbols shown overlaid or augmented to the 2D-images.

In the shown example, each of the lines segments 2*a* can be located somewhere along this same corner-feature in each of the 2D-visual pictures 1*a*,1*b*. In order to further resolve ambiguity in the conglomeration of the first and second 3D-model 4*a*,4*b* in an additional degree of freedom, there is a second pair of line sections 2*b*, comprising a third line section 2*b* defined in the first 2D-visual-image 1*a* and a corresponding fourth line section 2*b* in the second 2D visual picture 1*b* shown, which are located at the top corner of the room. In many instances of the present invention, there can be an automatic matching of pairs of the line features 2*a*,2*b* in-between the first and second 2D-visual image, e.g. as often only one matching is geometrically resolvable and/or makes technical sense. Therefore, in many embodiments it can be omitted that the used actually names the line-sections to match them into pairs, but the system according to the present invention can resolve those pair-matching automatically or semi-automatically by presenting one or more calculated reasonable suggestions to the operator for verification. In other embodiments, the pair-matching can be provided by the operator.

As an optional addition, there is also a pair of single points 6a defined, comprising a first point 6a in the first 2D-visual-image 1a and a corresponding second point 6a in the second 2D visual picture 1b. As another optional addition, there is also a pair of plane surfaces 6b defined, comprising a first surface 6b in the first 2D-visual-image 1a and a corresponding second surface 6b in the second 2D visual picture 1b. Such corresponding surfaces can be the same surface, wherein their definition can comprise common surface points, or different totally points of the same surface. Another option according to the invention can comprise a first surface 6b and a second surface 6b, which are not actually the same surface but which are provided together with a geometric constraint, e.g. as being parallel (like a floor and a tabletop) or orthogonal (like a floor and a wall or like two different walls)—see also below.

The number of such pairs of line sections 2, endpoints 2a, points 6a and planes 6b can vary within the common objectives that the sum of those are provided in such a way that the 3D-partial-models 4a,4b can be preferably unambiguously combined by the aid of those. Dependent on their exact setup one of such a pair can bring a restriction of definition in one or more degrees of freedom in the combination of the 3D-partial-models 4a,4b. Preferably, those pairs are arranged and configured in such a way that those result in an unambiguously combination of the 3D-partial-models 4a,4b. Therein, also redundancy can be deliberately introduced in order to increase accuracy, e.g. by some kind of known averaging or statistical approach.

The example in FIG. 3c illustrates yet another exemplary embodiment, in which line sections 2a that are indicating the same visual room corner feature are defined in each of a first and a second 2D-visual-pictures 1a,1b of a room taken from different viewing positions, each facing a different wall of the room. There are also other line sections 2b shown, which are not indicating the same corner features but which are paired by a restriction 5a according to which those two line sections 2b are in a 90° angular offset with respect to one another. Another restriction could be e.g. that the line sections 2b are in the same plane, which is the floor-plane, and optionally also that this plane—and therefore also the line sections 2b—are horizontal. Other examples for such a geometric restrictions of a pair of line sections, points or faces, according to the present invention can be that at least two of those are orthogonal, coinciding, having the same direction, an angular offset, horizontal, vertical, parallel, etc. In the shown embodiment, the planes or faces 6b, can e.g. be restricted to perpendicular to one another.

FIG. 3d illustrates an example of an embodiment according to the invention, where the line sections 2t are not only straight, but comprising multiple line sections. Specifically, in this example there is a pair-of-edges-template 2t shown, which is placed in each room corner in the 2D-visual picture 1a and 1b. The pair-of-edges-template 2t can therein optionally also comprise the geometric restriction 5 that it has an offset of 90° in the different 2D-visual-images 1a,1b. In order to fit the pair-of-edges-template 2t into the 2D-visual-image 1a resp. 1b, there are handles 7 provided, by which the pair-of-edges-template 2t can be adapted to the 2D-visual-images 1a,1b, as discussed below.

FIG. 4a, FIG. 4b and FIG. 4c, are illustrating another example of 2D-visual-images 2a,2b,2c of a scene to be 3D-modeled. In this case the 3D-scene of which a 3D-model 4 is derived according to the invention comprises more than two different 2D-visual-images 1a,1b,1c and corresponding 3D-partial-models 4a,4b,4c, e.g. in form of depth-images, cloud-points, etc. According to the invention, there are the shown line-sections 2a,2b,2c and/or thereto linked geometric restrictions 5 are provided in each of the 2D-visual images 1a,1b,1c. In this example, the line-sections 2a,2b,2c are shown to be embodied as directional vectors, whereof some can be referenced to each other, e.g. by the shown angular restrictions, like the shown bows for 180° or 90° arrangements. Other such restrictions can be that some of the vectors are substantially the same vector in different visual images 1a,1b,1c, or that they have substantially the same direction, respectively are substantial parallel or coaxial, like by matching them in pairs (or triplets, etc.) e.g. by specific colors, or that they are in the same (floor-) plane, or that they are establishing a horizontal or vertical reference, etc. For example, those line-sections 2a,2b,2c and/or geometric restrictions 5 can be provided by a human operator, preferably at least partially assisted by an automatic detection unit according to the invention as discussed below.

Specifically, an embodiment of the invention can present results in form of line sections (and optionally also points or faces) which are derived by the automatic detection unit, as suggestions to the operator, who verifies, corrects or dismisses those suggestions. The detection unit can therein comprise image processing means for deriving and/or identifying image features such as e.g. edges, corners, lines, intersections, etc., preferably in sub-pixel resolution of the 2D-visual-image. In another embodiment according to the invention, the operator can manually define the line-sections 2 in the 2D-visual-image according to the invention, preferably aided by the automated image processing features like e.g. an automatic snapping function for snapping an line-section 2, handle 7, point 6a, face 6b, etc. to a image-detected edge-feature in the 2D-visual-image 1, which is close to the location where the operator places the line-section 2. Optionally, there can also be a manual adjustment feature, e.g. by providing handles to manually adjust an automatic snapping if it is not as desired. Another option according to an aspect of the invention is an automatic auto-zoom function of the 2D-visual-image 1 at the section of the 2D-visual-image where the line segment 2 is placed.

In FIG. 5a and FIG. 5b there are two abstracted 2D-visual-images 1 of a corner symbolized. There are three line-segments 2a,2b,2c in each, which share a common intersection point at the corner. According to the invention, there can be an automatic or semi-automatic auto detection of such image features in the 2D-visual-images 1. A semi-automatic approach can e.g. be embodied in such a way that an operator pre-selects a certain portion or adjacency in the 2D-visual-image 1 in which the automatic function will then be used. By doing so, e.g. edges can be detected in the 2D-visual-image 1, and then a line section 2, in the shown case a ray-type line section with a defined starting point at the corner-intersection point, can be overlaid, preferably graphically overlaid by an illustration of the line section in the 2D-visual-image 1 which is provided to the operator. A first line 2a section in a first 2D-visual-image 1a is therein automatically and/or manually linked and/or geometrically restricted 5a to the same or another line section 2a,2b,2c,6a in the second visual image 1b. By the information derived from this 2D-visual-image 1 line-section 2 providing, the corresponding 3D-partial models 4a,4b can be linked to form a single 3D-model 4 of a compound scene, in particular by applying thereof the resulting geometric links and restrictions in the 3D-partial-models 4*a*,4*b*.

FIG. 6*a* and FIG. 6*b* are showing a similar embodiment as above, but herein at least one of the line segments 2*am* in the first 2D-visual-image 1*a* is set manually, by manipulating handles 7 of the line section 2*a* in the 2D visual image view, one moved to the intersection point and the other being one random point along the edge. Such can e.g. also be advantageous when portions of the edge are obstructed by items and not visible, whereby automatic detection is complicated. Such can e.g. also comprise an automatic snapping to an image detected visual edge feature. Also the intersection point 6*am* is manually corrected. The line segment 2*c* in the 2D-visual-image got the geometric restriction 5*a* applied, according to which it is substantially perpendicular to the line sections 2*a* and 2*b*.

FIG. 7*a* and FIG. 7*b* the view is similar to above, but the line sections 2*am*,2*bm*,2*cm* were set by the operator by placing handles 7 on the visual edges in the 2D-visual images 1*a* and 1*b*. The intersection 6*a* was found automatically and provided as suggested additional point for conglomerating the visual 3D-images.

By FIG. 8*a* to FIG. 8*d*, there is another embodiment of the surveying of a true-to-size 3D-model according to the invention illustrated. As shown before, FIG. 8*a* as well as FIG. 8*b* are showing 2D-visual-images, in which line sections 2 are overlaid, by which the corresponding 3D-partial models are conglomerated to a 3D-model 4 as illustrated in FIG. 8*d*. In the shown example, the 2D-visual-images are overlaid by some first line-segments 2*a*,2*b*,2*c* as well as by some elucidations to aid the description of the invention—like the texts next to the line-segments, the heading, etc.—which are not necessarily mandatory to be shown in practical embodiments.

In the optional addition shown here, there is also a plan 9 or floor-plan of the 3D-scene provided, as symbolized in the 3D view of a floor plan 9 in FIG. 8*c*. This illustrates a known or pre-defined floor plan 9 of the 3D-scene to be modeled, wherein this known or pre-defined floor plan 9 is not required to be drawn to scale, as such scaling can result from the measurements according to the invention. It can e.g. be a rough sketch or predefined, non-full-scale template, such as e.g. a cubical room-template or the like. The plan-template 9 according to the invention can therein in particular be used to provide geometrical restrictions 5 in way which is intuitive to the operator without having to bother with numerical values or symbols, but to be applied visually in 2D screen view. In particular the line segments 2 can therein be matched to corresponding plan features 2*p* and 2*h* of the plan 9. For example, the feature 2*p* can be an Edge 2 as defined in the images at FIG. 8*a* and FIG. 8*b* and the feature 2*h* can be a height reference or horizontal reference 2 as indicated in those images. Another option which is here shown, but which could also be considered independently of the 3D-plan-view is a 2D-view 10 in which information regarding the field of view of the device can be graphically defined and provided, in particular as additional information for the conglomeration of the 3D-partial models 4*a*,4*b*, whereby additional geometric restriction for the combination of the 3D-partial-models 4*a*,4*b* can be derived which aid the process of combining them in a true to size manner. In this example, the (at least roughly) indicated marking 10*v* refers to a selected wall of the floor-plan 10 and/or 9, which indicates the wall which shown in the picture 1*b* of FIG. 8*b* in the floor-plan, and can provide a linking information in-between the 3D-partial-models (and/or pictures 1*a*, 1*b*), and the floor plan—which information can be used to derive the true to size 3D-model for the floor-plan on basis of the 3D-measurements of the 3D-partial-models which are combined according to the information derived by the line segments indicated in corresponding 2D-pictures which were captured. The indication 10*v* can easily be done by the operator, but can also be at least partially assisted or automated by technical aids like a compass, a level sensor, an accelerometer, a gyroscope, an IMU or the like.

In the embodiment of FIG. 9, there is a similar embodiment comprising an additional plan view 9 in the provision of the line segments 2*a*,2*b*,2*c*, besides the 2D-visual-images 1*a* and 1*b*. The there shown 2D-floor-plan-view 9 can therein define geometric relations and/or restrictions to be—at least approximately met by the line sections 2*a*,2*b*,2*c* and accordingly by the corresponding 3D-partial-models 4*a*,4*b*, which are actually to be combined in a dimensionally accurate manner. As one possible example, there is an angular restriction 5 of 90° in-between the two walls defined by the line sections 2*a*,2*b*,2*c*, provided in the plan view 9.

The floor plan 9 can an approximate template, part of a CAD-plan of the scene to be measured or e.g. also be generated (and exactly measured) by the same device, using an incorporated point to point measurement by an accurate DISTO-functionality.

In FIG. 10*a* an exemplary embodiment of a device 20 according to the invention is shown. The shown example device 20 is embodied to be handheld by an operator during use, in particular in view of size and weight. The handheld device 20 can optionally also comprise a coupling element 29 to be attached to a kind of tripod or stick to keep it more still during the measurements. The device 20 preferably comprises a 2D visual display 28 for providing the operator with the 2D-visual-images, line sections and other measurement relevant information, but can optionally also be linked to an external display unit, computer or tablet, either wired or wireless. For operating the device 20, the display 28 can be a touch-screen and/or the device 20 can comprise dedicated buttons 27.

The device 20 according to the invention at least comprises a 2D-visual-image-sensor 22*a*,22*b*,22*c* or 2D-visual-imaging-camera (such as a CCD- or CMOS-camera) for deriving the 2D-visual-images. In the shown embodiment, there are two cameras 22*a* and 22*b*, here shown with optional light sources 26*a*,26*b* or flashlights. Those cameras can be digital RGB-cameras and are arranges in a stereo-basis, whereby those can not only take the 2D-pictures, but can also be used in combination as 3D-sensor operating on the stereo imaging principle to derive a 3D partial model, which can be derived on basis of images from both of the cameras and their fixed stereo-basis distance. Those cameras can therein be calibrated, in particular with respect to their optical aberrations and deficits, preferably numerically calibrated in a numerical image processing unit or processor. Optionally the device 20 can also comprise one or more light sources 26*a*,26*b*, e.g. embodying flashlights for taking 2D pictures in low light environments.

In another embodiment there could also be a dedicated 3D-measurement-sensor 21 (which is not mandatory in the shown stereo imaging approach with cameras 22*a* and 22*b*), for deriving the 3D-partial models (such as e.g. a RIM-camera, a structured light sensor, a triangulation sensor, etc.). If such a dedicated 3D-measurement-sensor 21 is present and it comprises an internal 2D visual imaging functionality (as e.g. often the case for RIM-cameras, etc), the cameras 22*a* and 22*b* can be not mandatory, but at least one of them is still an option, e.g. for taking higher quality 2D visual images. Another embodiment can also comprise one or more cameras 22a,22b and a 3D-measurement-sensor 21 as well.

In FIG. 10b a first exemplary embodiment of a block diagram of a device 20 according to the invention is shown.

It comprises a 3D-sensor-block 21 configured for determining a 3D-measurement information 4 of its field of view (e.g. in form of a depth-image), which is herein also referenced as 3D-partial-model 4. The 3D-sensor-block 21 of this embodiment therefore comprises at least two 2D-image-sensor-blocks 22 in known arrangement, configured for deriving 2D-visual-images 1 their corresponding fields of view. According to the known arrangement, the images from those 2D cameras 22a,22b are processed to derive a 3D model of their fields of view. For example, cameras 22a and 22b can be cameras of stereoscopic-view 3D-sensor 21. The device comprises a computation unit 25, such as a microprocessor or a similar electronic device, which is configured to provide the calculations for the method according to the invention, in particular computing the 2D-visual-images 1 and the 3D-partial-models 4 as well as the line sections 2 according to the invention, e.g. by a stored computer program. The computation unit can therein comprises a conglomerator 23, which is calculating a combination of multiple 3D-partial models 4a,4b which were taken with different views comprising different portions of the 3D-scene which has to be recorded, to form a true to size combined 3D-model. The different views can in particular point in different directions and/or being taken from different locations, preferably with the views being overlapping by at least a small portion. The 2D-images and the 3D-model for each of those views are in a known reference to each other, in particular as the 3D-model had been derived from those images, whereby a known corresponding of geometric features in the 2D-image and in the corresponding 3D-partial model can be established. According to the invention by defining and using the line segments 2a in multiple of the 2D-images for the same geometric feature, the combination of the corresponding 3D-partial models can be established, e.g. for resolving 3D-geometric ambiguities in one or more dimensions based on restrictions defined by the line-segments 2 in the 2D-visual-images 1.

In FIG. 10c a second exemplary embodiment of a block diagram of a device 20 according to the invention is shown.

It comprises a 3D-sensor-block 21 configured for determining a 3D-measurement information 4 of its field of view, e.g. in form of a depth-image, point-cloud, etc. which is herein also referenced as 3D-partial-model 4. The 3D-sensor-block 21 can e.g. be embodied as a RIM-camera, (in particular based on the time of flight measurement principle, a structured light 3D-sensor, a triangulation sensor, a laser stripe sensor or another 3D-sensor. The device also comprises at least one 2D-image-sensor-block 22, configured for deriving 2D-visual-images 1 of its field of view. The fields of view of the sensors 21 and 22 are therein overlapping, at least partially but preferably substantially. In some embodiments, the 2D-camera 22 can not only be standalone as indicated by 22c, but can also be a functional part of the 3D-sensor 21, which part (22) is capable of taking visual 2D-images 1, as e.g. indicated (22). For example, in one embodiment, camera (22) can be an inherent 2D-imaging functionality of the 3D-sensor 21, like a capability of taking 2D-RGB-pictures. Alternatively the 2D-imaging functionality for taking the 2D images according to the invention can also be provided by a separate camera 22c, which has a defined arrangement and field of view with respect to the 3D-sensor 21. The device comprises a computation unit 25, such as a microprocessor or a similar electronic device, which is configured to provide the calculations for the method according to the invention, in particular computing the 2D-visual-images 1 and the 3D-partial-models 4 as well as the line sections 2 according to the invention, e.g. by a stored computer program. The computation unit can therein comprises a conglomerator 23, which is calculating a combination of multiple 3D-partial models 4a,4b to form a true to size combined 3D-model, according to the invention by involving the line segments 2a for the same visual or geometrical features in the combining calculations, e.g. for resolving 3D-geometric ambiguities in one or more dimensions based on restrictions defined by the line-segments 2 in the 2D-visual-images 1.

Figure 11:
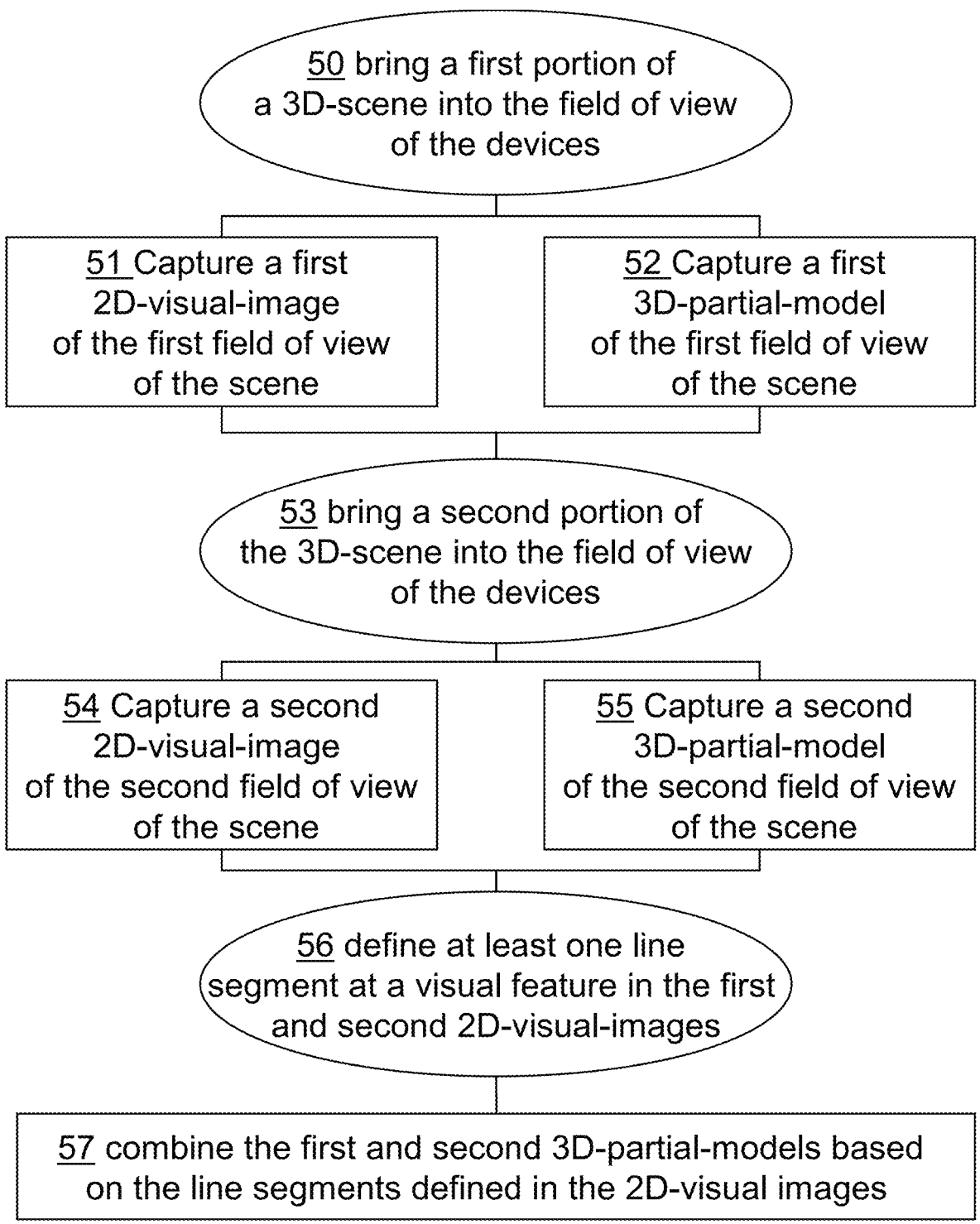
FIG. 11 shows an example of a block diagram illustrating the principle of an embodiment of the method according to the invention.

The method for measuring a true-to-size 3D-model according to the invention can therein be embodied comprising the steps as shown in the example of a basic block diagram of FIG. 11.

In block 50, a first portion of a 3D-scene which has to be captured is brought into the field of view of the device 20, for example a wall of a room or at least part of the wall. In order to have minimal perspective distortions, the viewing direction can be chosen to be substantially perpendicular to the wall—although not strictly required according to the invention, most operators will intuitively do so.

In block 51, a capturing of a first 2D-visual-image 1a of the first field of view of the scene is done, for example by an ordinary 2D-digital-camera at the device 20.

In block 52, a capturing of a first 3D-partial-model 4a of the first field of view of the scene is done, preferably substantially at the same time as the 2D-visual-image 1a is taken, e.g. by an optical 3D-capturing-unit, like a stereographic camera, a range imaging (RIM) camera, a time of flight (TOF) camera, a structured light measurement, a triangulation measurement, light sectioning, etc.

In block 53, a second portion of the 3D-scene is brought into the field of view of the device 20, for example by relocating and/or reorienting the device.

In block 54, a capturing of a second 2D-visual-image 1b of the second field of view of the scene is established.

In block 55, a capturing of a second 3D-partial-model 4b of the second field of view of the scene is done, e.g. in the same way as the first one. Dependent on the size of the scene and the field of view there can also be more than the first and a second capturing as described above.

In block 56, a defining of at least one line segment 2a at a visual feature in the first and in the second 2D-visual-images 1a,1b is done, which can be done automatically, semi-automatically or manually by an operator.

In block 60, a combining or conglomerating of the first and second 3D-partial-models 4a,4b is established based on the line segments 2a defined within the 2D-visual-images 1, e.g. by applying geometrical restrictions resulting from defined pairs of line segments 2a in-between the first and second 2D-images and their respective relations.

What is claimed is:

1. A method for a three dimensional surveying of a three-dimensional (3D) scene for deriving a true-to-size 3D-model, the method comprising:
    deriving a first 3D-partial-model of a section of the 3D-scene, which deriving comprises a capturing of at least one corresponding first 2D-visual-image of the section of the 3D-scene having a first line segment defined therein;
    deriving a second 3D-partial-model of a section of the section of the 3D-scene, which deriving comprises a capturing of at least one corresponding second 2D-visual-image of this section of the 3D-scene, the second 3D-partial-model being different from the first 3D-partial-model, the second 2D-visual-image having a second line segment defined therein, and the first and the second 3D-partial-models are partially overlapping; and conglomerating the first 3D-partial-model with the second 3D-partial-model to form the 3D-model of the 3D-scene, the method further comprising:

defining the first line segment at a first visual feature in the first 2D-visual-image;

defining the second line segment at a second visual feature in the second 2D-visual-image, wherein the defining of at least one of the first line segment at the first visual feature or second line segment at the second visual feature is by an operator to obtain at least one of an operator defined first line segment or an operator defined second line segment, wherein the first visual features is the same or different from the second visual feature; and utilizing the operator defined first line segment in the first 2D-visual-image or the operator defined second line segment in the second 2D-visual image in the conglomerating of the corresponding first 3D-partial-model or second 3D-partial-model to form the 3D-model of the 3D-scene, wherein the first and second line segments represent a visual feature in each of the first and second 2D-visual-image.

2. The method according to claim 1, wherein
in addition to the first and the second line segments, one common point of the first and the second line segments is defined within the first and the second 2D-visual-image, or
in addition to the first and the second line segments, two common endpoints of the first and the second line segments are defined within the first and the second 2D-visual-image, or
in addition to the first and the second line segments, at least one section of a common plane is defined within the first and the second 2D-visual-image are spanning the common plane, or
in addition to the first and the second line segments, at least one common singular point is defined within the first and the second 2D-visual-image, or a combination of at least two of above.

3. The method according to claim 1, wherein a group of two or more interconnected first or second line segments is defined to correspond to a geometric feature or of a construction work feature.

4. The method according to claim 1, wherein defining the first or second line segment is performed by graphically overlaying a graphical line symbol on the 2D-visual-image provided at a 2D visual display for aligning the graphical line symbol on the 2D-visual-mage by user interaction.

5. The method according to claim 1, wherein the first or second line segment comprise at least two handles, which are movable within the 2D-visual-image, for bringing said line segment into congruence with an visible edge—or line-feature within the 2D-visual image to which said line segment is brought into congruence.

6. The method according to claim 1, wherein an automatic snapping of the first or second line segment to a visual image feature such as a visible edge—or corner feature in the 2D-visual-image is provided.

7. The method according to claim 1, wherein the first and the second line segments are assigned to a therewith corresponding feature in a virtual plan view of the 3D-scene.

8. The method according to claim 2, wherein the first or second line segment has defined an angular constraint with respect to an additional line segment, point, or plane.

9. The method according to claim 8 wherein the angular constraint is automatically derived from the virtual plan view.

10. The method according to claim 1, wherein a point of view or direction of view for the deriving the first 3D-partial-model differs from the one for the deriving the second 3D-partial-model.

11. The method according to claim 1, wherein by the defining the first line section within the first 2D-visual-image, the second line section is automatically defined within the second 2D-visual-image, by automatically identifying analogous features within both of the 2D-visual-images by a numeric image processing unit.

12. The method according to claim 1, wherein a capturing of the 3D-partial-models is established by a stereo-camera, a triangulation or structured light arrangement, wherein the corresponding 2D-visual-image is captured by a camera of said stereo-camera, triangulation or structured light arrangement.

13. A surveying device carrying out the method according to claim 1, the surveying device comprising:
a 3D-sensor for deriving the 3D-partial-models;
a 2D-visual-image-sensor for deriving the 2D-visual-images;
a 2D visual display for providing the 2D-visual-images with a touch screen for defining the line segments, and
a numerical processing unit with a conglomerator for calculating the conglomerating of the 3D-partial-models based on the defined line segments.

14. The device according to claim 13, wherein the device comprises at least two 2D-imaging cameras arranged in a stereo-basis with respect to each other, for a stereoscopic deriving of the 3D-partial-models as well as for capturing the 2D-visual images, whereof at least one of those 2D-imaging cameras is the 2D-visual-image-sensor, or the device comprises at least one 2D-imaging camera and at least one 3D-point-cloud or range image measuring unit.

15. A computer program product comprising program code stored on a non-transitory machine-readable medium, wherein the program code is configured for deriving a true-to-size 3D-model of a 3D-scene by performing the method of claim 1.

16. The method according to claim 1, further comprising:
providing a geometric constraint in-between the first and second line segments; and
utilizing the first and second line segments in the 2D-visual-images and their geometric constraint in the conglomerating of the corresponding first 3D-partial-model and second 3D-partial-model to form the 3D-model of the 3D-scene.

17. The method according to claim 1, wherein the defining of the first line segment and/or second line segment in the 2D-visual-images is done manually or semi-automatically by the operator.

18. The method according to claim 3, wherein the first or second line segments are defined by forming a template of the geometric feature or of the construction work feature.

19. The method of claim 6, wherein the visible edge- or corner feature is derived by an automatic pattern recognition unit.

20. The method of claim 8, wherein the angular constraint defines a perpendicularity or a parallelism.

21. The method of claim 1, wherein the first 3D-partial-model and second 3D-partial model are different views of the same 3D-scene.

* * * * *